(12) United States Patent
Hayashida et al.

(10) Patent No.: US 7,043,852 B2
(45) Date of Patent: May 16, 2006

(54) MEASURING INSTRUMENT

(75) Inventors: Shuuji Hayashida, Kawasaki (JP); Yuji Fujikawa, Kawasaki (JP); Yuichi Ichikawa, Kawasaki (JP); Osamu Saito, Kawasaki (JP); Nobuyuki Hayashi, Kawasaki (JP); Takahiro Nakamura, Kure (JP); Yuuzou Hashimoto, Kure (JP); Tomio Omori, Kure (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 10/520,942

(22) PCT Filed: Jun. 9, 2004

(86) PCT No.: PCT/JP2004/008372

§ 371 (c)(1),
(2), (4) Date: Jan. 12, 2005

(87) PCT Pub. No.: WO2004/109223

PCT Pub. Date: Dec. 16, 2004

(65) Prior Publication Data

US 2005/0274034 A1 Dec. 15, 2005

(30) Foreign Application Priority Data

Jun. 9, 2003 (JP) ............................. 2003-164246

(51) Int. Cl.
*G01B 3/18* (2006.01)

(52) U.S. Cl. .............................. 33/813; 33/831; 33/814
(58) Field of Classification Search .................. 33/813, 33/814, 825, 831, 818, 819, 820, 822
See application file for complete search history.

(56) References Cited

U.S. PATENT DOCUMENTS

| 3,971,137 | A | * | 7/1976 | Fernandez | 33/814 |
| 4,485,556 | A | * | 12/1984 | Sakata et al. | 33/794 |
| 4,550,507 | A | * | 11/1985 | Nishikata | 33/701 |
| 4,578,868 | A | * | 4/1986 | Sasaki et al. | 33/819 |
| 6,176,021 | B1 | * | 1/2001 | Sato et al. | 33/813 |
| 6,247,244 | B1 | * | 6/2001 | Zanier et al. | 33/819 |
| 6,289,595 | B1 | * | 9/2001 | Galestien | 33/199 R |
| 6,553,685 | B1 | * | 4/2003 | Nishina et al. | 33/815 |
| 2003/0037455 | A1 | * | 2/2003 | Terui et al. | 33/813 |
| 2003/0121169 | A1 | * | 7/2003 | Hayashida et al. | 33/813 |
| 2004/0250439 | A1 | * | 12/2004 | Hayashida et al. | 33/813 |

FOREIGN PATENT DOCUMENTS

| JP | U-49-080260 | 10/1947 |
| JP | A-54-130152 | 10/1979 |
| JP | U-07-002907 | 1/1995 |

* cited by examiner

*Primary Examiner*—Diego Gutierrez
*Assistant Examiner*—Amy R. Cohen
(74) *Attorney, Agent, or Firm*—Oliff & Berridge, PLC

(57) ABSTRACT

A measuring instrument that includes a tube 21 having a female thread 211 and a spindle 3 having a lead screw 31 screwing with the female thread 211 and capable of being advanced and retracted in an axial direction along with rotation around the axial center, and measures dimensions etc. of a workpiece according to displacement in an axial direction of the spindle 3 based on a rotation amount of the spindle 3. According to this measuring instrument, a pitch P of the lead screw 31 is twice as large or more than the difference between an external diameter R and a core diameter r thereof, and the difference between the external diameter R and the core diameter r is one-fifth or less of the external diameter R. Because of the lead screw 31 with the large pitch, the spindle 3 can be moved at high speed, thus enhancing operational performance of the measuring instrument.

9 Claims, 7 Drawing Sheets

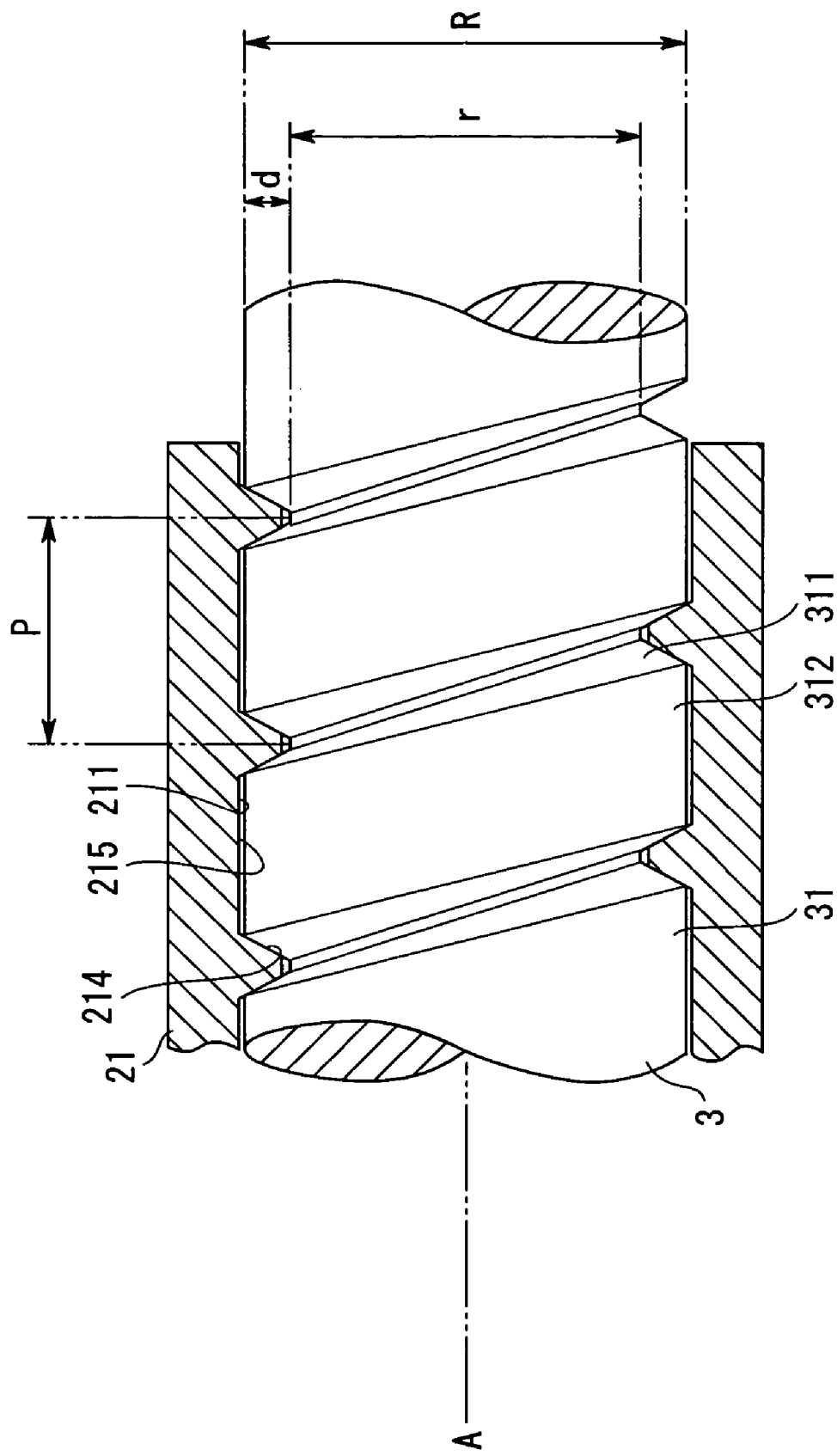

MEASURING INSTRUMENT

TECHNICAL FIELD

The present invention relates to a measuring instrument that measures dimensions etc. of a workpiece by advancing and retracting a spindle along with its screwing rotation, for instance, the present invention relates to a measuring instrument as typified by a micrometer or a micrometer head.

BACKGROUND ART

Conventionally, there has been known a measuring instrument, for instance, the one typified by a micrometer, a micrometer head or the like, that has a main body provided with a female thread and a spindle provided with a male screw, and measures dimensions etc. of a workpiece by advancing and retracting the spindle along with its screwing rotation. An example of the measuring instrument is disclosed in, for instance, Reference 1: JP S49-80260U, Reference 2: JP S54-130152A.

According to such a measuring instrument, displacement per rotation of the spindle is defined by a screw pitch of the male screw formed on the spindle.

The screw pitch of the male screw formed on the conventional spindle is typically 0.5 mm or 0.635 mm.

However, since the screw pitch of the male screw formed on the spindle is 0.5 mm or 0.635 mm, the spindle must be rotated for many times as an object to be measured is changed because the displacement per rotation of the spindle is small, thus raising a problem on its operational performance.

Here, it is conceivable that a multiple thread screw is applied to the male screw of the spindle for increasing the displacement per rotation of the spindle. For example, a triple thread screw may be employed to triple the displacement per rotation. However, in order to machine the multiple thread screw precisely, a plurality of outside helixes must be formed with accurate phase difference. In the case of the triple thread screw, although three outside helixes for a screw need to be formed with the phase difference by 120 degrees, it is difficult to machine such a multiple thread screw with that phase difference maintained precisely, and machining error may cause measurement error. Additionally, it is also difficult to accurately form many outside helixes with the equal pitch, thereby increasing the machining cost thereof as the number of the outside helixes increasing.

DISCLOSURE OF THE INVENTION

An object of the present invention is to provide a measuring instrument realizing high measurement accuracy and high-speed movement of a spindle by solving the above-described problems. Therefore, the present invention employs the following configuration.

A measuring instrument according to an aspect of the present invention includes: a main body having a female thread; and a spindle having a lead screw screwed with the female thread and capable of being advanced and retracted in an axial direction along with rotation around the axial center, in which a pitch of the lead screw is twice as large or more than the difference between an external diameter and a core diameter of the lead screw, and the difference between the external diameter and the core diameter is one-fifth or less of the external diameter.

With such a configuration, when the spindle is rotated, the spindle is advanced and retracted along with screwing rotation of the spindle against the main body. Counting a rotation amount of the spindle at this time, the displacement of the spindle can be figured out according to the movement pitch per rotation of the spindle, thus obtaining the measurement value.

Since the lead screw has the large pitch twice as large or more than the difference between the external diameter and the core diameter, the movement pitch per rotation of the spindle can be enlarged. Accordingly, the spindle can be moved at high speed, and the operational performance of the measuring instrument can be enhanced. While the spindle needs to be displaced according to an object to be measured as the object is changed, the spindle can be advanced and retracted at high speed with the small rotation number if the lead screw has the large pitch, thus reducing effort and time spent on the measurement.

When the thread groove depth is increased for enlarging the screw pitch, the machining allowance for cutting the spindle will be increased and the strength thereof will be deteriorated. This may cause a risk of deteriorating the measurement accuracy caused by deflection or the like of the spindle. However, the strength of the spindle can be ensured enough by restricting the difference between the external diameter and the core diameter of the lead screw to be one-fifth or less of the external diameter, thus the measurement accuracy can be highly maintained.

Preferably, adjacent thread grooves of the lead screw may be formed to have predetermined intervals in a direction along a screw axis line, and an intermediate portion of thread grooves may be defined between the adjacent thread grooves as a straight line along the screw axis line on a cross-section along the screw axis line.

With this arrangement, the screw pitch is enlarged for the predetermined intervals when the predetermined intervals are provided between the adjacent thread grooves. Accordingly, the lead screw having the large pitch can be provided without the thread grooves cut deeply.

Preferably, the female thread may have screw threads of the same pitch as that of the thread grooves, as seen in a direction along the screw axis line of the female thread, the adjacent screw threads being formed with predetermined intervals, and an intermediate portion of threads being defined between the adjacent screw threads as a straight line along the screw axis line on a cross-section along the screw axis line.

With this arrangement, since the female thread has screw threads only at the part where the female thread fits to the thread grooves of the lead screw but does not have screw root threads at the intermediate portion of threads, the machining allowance will not be increased even in the case of the female thread screwing with the lead screw with the large pitch. Accordingly, since the main body needs not be cut deeply, the strength of the main body can be ensured.

Preferably, in the present invention, the measuring instrument may include: the main body having an anvil at an end of a substantially U-shaped frame and a female thread at the other end thereof; the spindle having a lead screw screwed with the female thread, being screwed with the other end of the main body, and being advanced to and retracted from the anvil along with screwing rotation of the spindle; a detector that detects displacement of the spindle in the axial direction according to a rotation amount of the spindle; and a display unit that displays a measurement value on the basis of a detection signal from the detector, in which a pitch of the lead screw may be twice as large or more than the difference between an external diameter and a core diameter of the lead screw, and the difference between the external diameter and the core diameter may be one-fifth or less of the external diameter.

With this arrangement, since the spindle has the lead screw with the large pitch when an object to be measured is held between the anvil and the spindle from the state that the anvil abuts on the spindle, the same advantages as the claim 1 can be obtained. In other words, the movement pitch per rotation of the spindle is increased, so that the spindle can be moved at high speed, thus reducing effort and time spent on the measurement.

Preferably, in the present invention, the detector may include: a stator provided on the main body; a rotor facing to the stator; an engaging groove provided on the spindle along the axial direction; an engaging pin provided on the rotor for engaging with the engaging groove; and a pressurization unit that pressurizes the engaging pin toward the engaging groove.

With this arrangement, as the spindle is rotated, the rotation of the spindle is transmitted to the rotor because of the engagement between the engaging groove of the spindle and the engaging pin of the rotor. Accordingly, the rotor is rotated only by the same rotating angle as the spindle, and besides, the rotating angle of the rotor is read by the stator. Thus, the rotating angle of the spindle can be found out, as well as the displacement of the spindle by the pitch per rotation of the spindle.

According to the pressurization unit, since the engaging pin is pressurized toward the engaging groove, the engaging pin can securely be fit to the engaging groove without clearance, thus transmitting the rotation of the spindle to the rotor accurately. Thus, the reading error of the rotating angle of the spindle by the detector can be reduced, and the measurement accuracy can be enhanced.

Meanwhile, since the movement pitch per rotation of the spindle is enlarged by using the spindle that has the lead screw with the large pitch, the detection accuracy of the detector needs to be improved. Only a slight clearance between the engaging pin and the engaging groove may cause a large effect on the measurement. However, the engaging pin can fit to the engaging groove without clearance due to the pressurization unit, so that the engaging pin will not shake at the clearance relative to the engaging groove, thereby realizing stable measurement.

Preferably, in the present invention, the engaging pin may be provided in a manner capable of sliding in a direction orthogonal to the axial direction of the spindle, and the pressurization unit fixed on the rotor at an end thereof may have a leaf spring that pressurizes the engaging pin toward the engaging groove at the other end thereof.

With this arrangement, since bend elasticity of the leaf spring provides pressurization for the engaging pin toward the engaging groove, the engaging pin can slide on the engaging groove as well as the engaging pin can fit to the engaging groove without clearance. Accordingly, the rotation of the spindle can accurately be transmitted to the rotor. Owing to this, the reading error of the rotating angle of the spindle by the detector can be reduced, and the measurement accuracy can be enhanced.

Preferably, in the present invention, the engaging groove may be formed in V-shape and a tip end of the engaging pin abutting on the engaging groove may be formed in spherical shape.

With this arrangement, since the V-shaped groove is widened toward the upper side and narrowed toward the lower side, the tip end of the engaging pin is abutted on the both sides of the V-shaped engaging groove without clearance. Besides, the tip end of the engaging pin is spherical, the contacting surface between the engaging pin and the engaging groove defines a point, the frictional force of which is small. Therefore, the engaging pin can slide on the engaging groove, as well as the engaging pin can fit to the engaging groove without clearance. Consequently, the measurement accuracy of the measuring instrument can be enhanced.

BRIEF DESCRIPTION OF DRAWINGS

FIG. 3 is an illustration showing the profile of a lead screw of a spindle of the aforesaid embodiment;

BEST MODE FOR CARRYING OUT THE INVENTION

An embodiment of the present invention will be described below with reference to the attached drawings.

Figure 1:
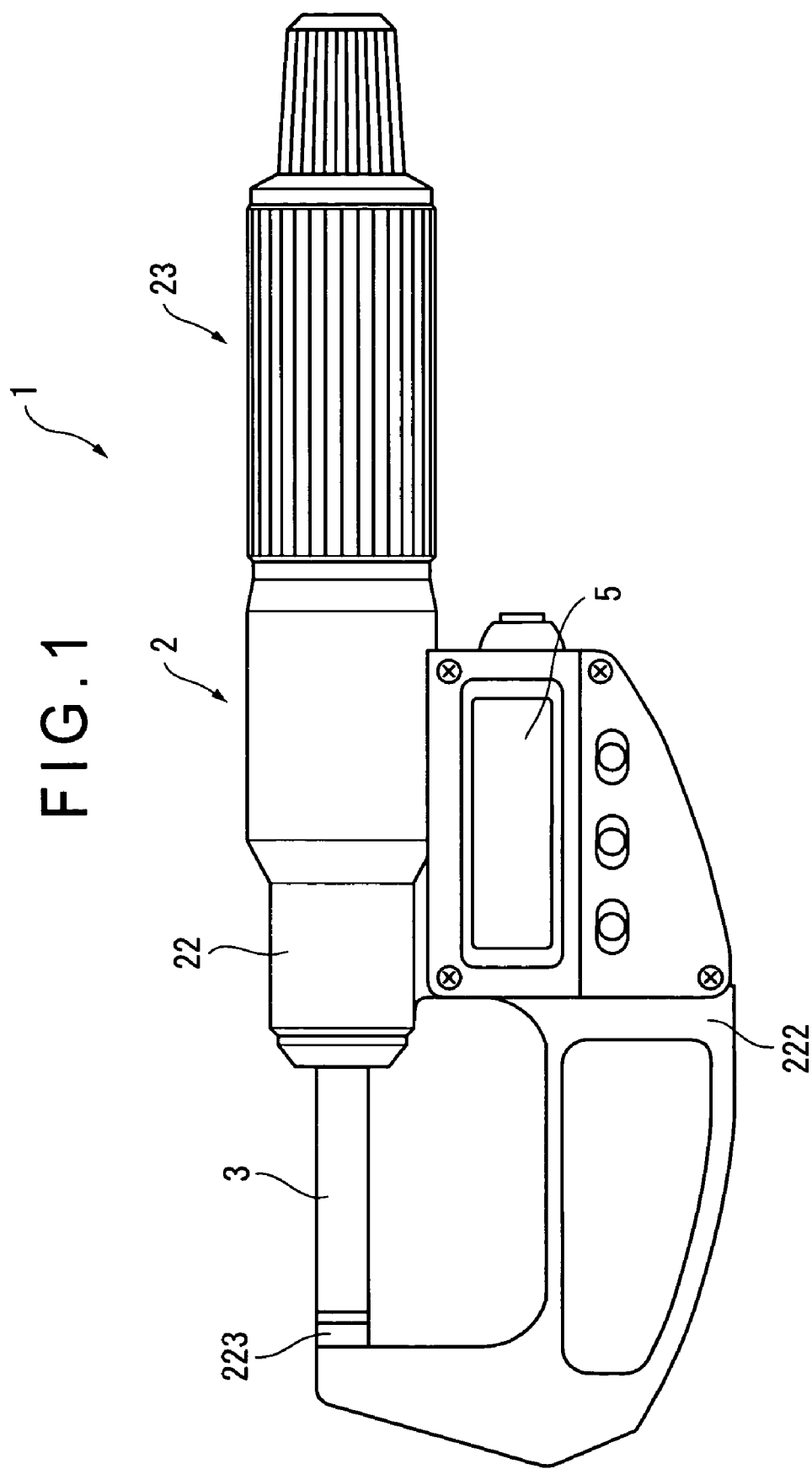
FIG. 1 is an illustration showing the exterior of a micrometer according to an embodiment of the present invention.
Figure 2:
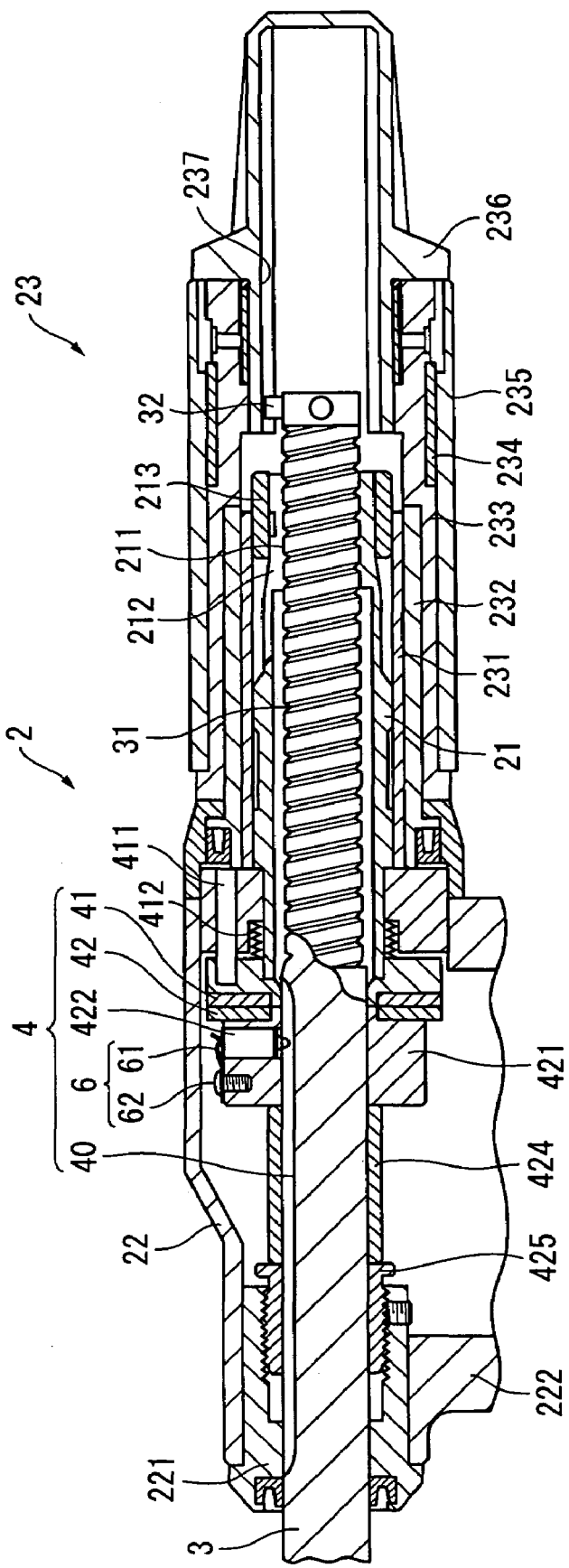
FIG. 2 is a cross-sectional view of the micrometer of the aforesaid embodiment.

FIG. 1 shows a micrometer, which is a first embodiment of a measuring instrument according to the present invention. FIG. 2 shows a cross-sectional view of FIG. 1.

This micrometer 1 includes a main body 2 having an anvil 223 at an end of a substantially U-shaped frame 222, a spindle 3 being screwed at the other end of the main body 2 and being advanced to and retracted from the anvil 223 in an axial direction along with its screwing rotation, a detector 4 that detects displacement of the spindle 3 in the axial direction from a rotation amount of the spindle 3, and a digital display 5 which is a display unit for displaying a measurement value on the basis of a detection signal from the detector 4.

The main body 2 includes a front tube 22, a rear tube 21 and a spindle rotating portion 23 sequentially arranged from an end of the main body 2.

The front tube 22 has a stem 221 provided on an opening of an end of the front tube 22, and the U-shaped frame 222 provided on the outside thereof. The U-shaped frame 222, which is provided with the anvil 223 at an end thereof to face to the spindle 3, is fixed to the front tube 22 at the other end thereof, and besides, the digital display 5 is provided on the surface thereof.

The rear tube 21 is connected to the front tube 22 at an end thereof, has a female thread 211 at the inner periphery of the other end thereof to screw with the spindle 3, is formed with slitting 212 at the other end thereof, and besides, is fixed by a nut 213 from the outside thereof.

The spindle rotating portion 23 includes an inner guide tube 231 and an outer guide tube 232 sequentially layered on the rear tube 21, an outer sleeve 233 rotatively provided on the outer guide tube 232, a thimble 235 provided on the outer sleeve 233 with a friction spring 234 being interposed therebetween, and a cap tube 236 provided on the other ends of the outer sleeve 233 and the thimble 235. The cap tube 236 is connected to the outer sleeve 233 by screwing with a screw. Additionally, a guide groove 237 is formed on the inner side of the cap tube 236 along the axial direction.

The spindle 3 projects from an end of the main body 2 to the outside by being inserted through the stem 221, and is provided with a lead screw 31 on the outer periphery of the other end of the spindle 3 to screw with the female thread 211 of the rear tube 21. A guide pin 32 is disposed on the other end of the spindle 3 to engage with the guide groove 237 of the cap tube 236. An engaging groove 40 is arranged on the spindle 3 along the axial direction.

As shown in FIG. 3, the lead screw 31 is a male screw which has a relatively large pitch P as well as a relatively small root thread depth d.

In other words, the pitch P of the lead screw 31 is large in which the pitch P is twice as large or more than the difference between its external diameter R and its core diameter r, and the difference between the external diameter R and the core diameter r is one-fifth or less of the external diameter R. When seeing along a screw axis line A, adjacent thread grooves 311 are formed with predetermined intervals, and an intermediate portion of thread grooves 312 is defined between the adjacent thread grooves 311 as a straight line along the screw axis line A on a cross-section along the screw axis line A.

For instance, the lead screw 31 has, as its dimensions, approximately 7.25 to 7.32 mm as the external diameter R, approximately 6.66 to 6.74 mm as the core diameter r, approximately 1 to 2 mm as the thread pitch P, approximately 55 to 65 degrees as the apex angle $\theta$ of the screw root thread, and approximately 5 degrees as the thread lead angle. Note that, the dimensions of the lead screw 31 are not limited particularly, and are appropriately chosen according to the lead, i.e., the advancement and retraction amount per rotation of the spindle 3. For example, the pitch P of the lead screw 31 may be triple, quintuple or decuple of the difference between the external diameter R and the core diameter r, and the difference between the external diameter R and the core diameter r may be one-seventh or one-tenth of the external diameter R.

The female thread 211 has screw threads 214 on the lead screw 31 with the same pitch. When seeing the female thread 211 along the screw axis line A, the adjacent screw threads 214 are formed with predetermined intervals, and an intermediate portion of threads 215 is defined between the adjacent screw threads 214 as a straight line along the screw axis line A on a cross-section along the screw axis line A.

The detector 4 has a stator 41 provided on the main body 2, a rotor 42 facing to the stator 41, the engaging groove 40 formed on the spindle 3 along the axial direction, an engaging pin 422 disposed on the rotor 42 for engaging with the engaging groove 40, and a pressurization unit 6 that pressurizes the engaging pin 422 toward the engaging groove 40.

The stator 41 is provided inside the front tube 22, and besides, is provided on an end of the rear tube 21. A detent pin 411 is interposed between the stator 41 and the front tube 22 to restrict the stator 41 from rotating. A spring 412 is interposed between the stator 41 and the front tube 22 so that the stator 41 is biased toward an end thereof.

The rotor 42 has a rotor bushing 421, which can rotate independently against the spindle 3, the rotor 42 being arranged on the other end of the rotor bushing 421 to face to the stator 41.

The rotor bushing 421 is biased via a clumping collar 424 toward the other end by an adjustment screw 425 screwed with the stem 221.

The stator 41 and the rotor 42 constitute a rotary encoder of electromagnetic induction type.

Figure 4A:
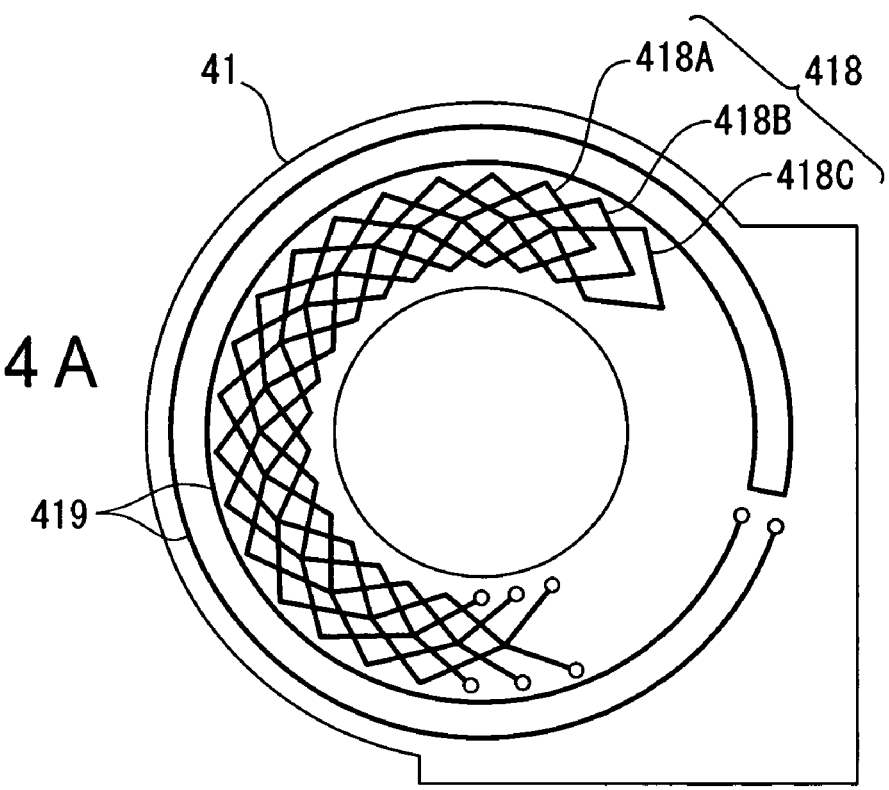
FIG. 4A is an illustration showing a stator of the aforesaid embodiment.

As shown in FIG. 4A, the stator 41 includes a transmitting winding 419 along the outer periphery of the stator 41 and a receiving winding 418 disposed on the inner side of the transmitting winding 419. The receiving winding 418 has winding patterns 418A, 418B and 418C of three types each of which rhombuses are continuously formed, these patterns being arranged to be shifted to each other by one-third of the pitch of the rhombuses.

Figure 4B:
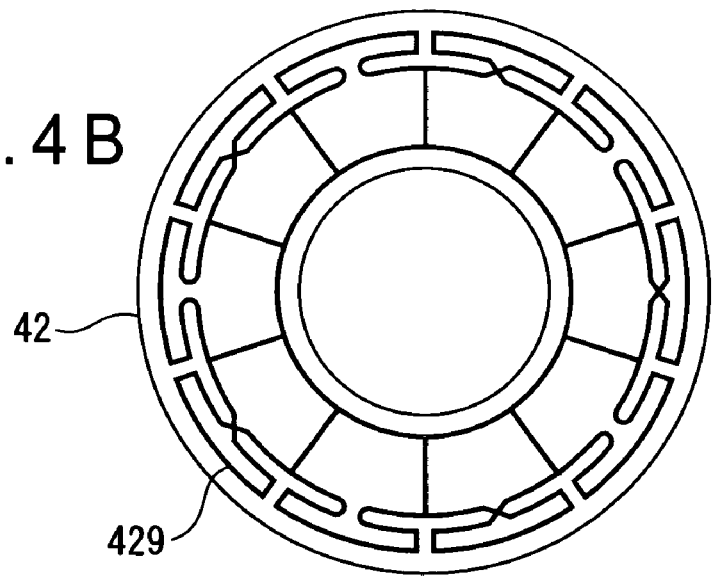
FIG. 4B is an illustration showing a rotor of the aforesaid embodiment.

As shown in FIG. 4B, the rotor 42 has a flux couplement winding 429 extending from the outer periphery to the inner periphery. The flux couplement winding 429 generates induction current due to electromagnetic induction caused by the transmitting winding 419 of the stator 41, and the induction current is detected by the receiving winding 418 of the stator 41. In the receiving winding 418, the signal output detected by each of the winding patterns 418A, 418B and 418C varies along with the relative rotation of the rotor 42 and the stator 41. According to the variation, the angular strain of the rotor 42 and the stator 41 can be detected.

In the present embodiment, corresponding to the male screw with the large lead of the spindle 3, a transmitting terminal 414 of the present embodiment is constituted of 24 pieces, which is three times as many as a transmitting terminal 414 of related art having 8 pieces.

Figure 5A:
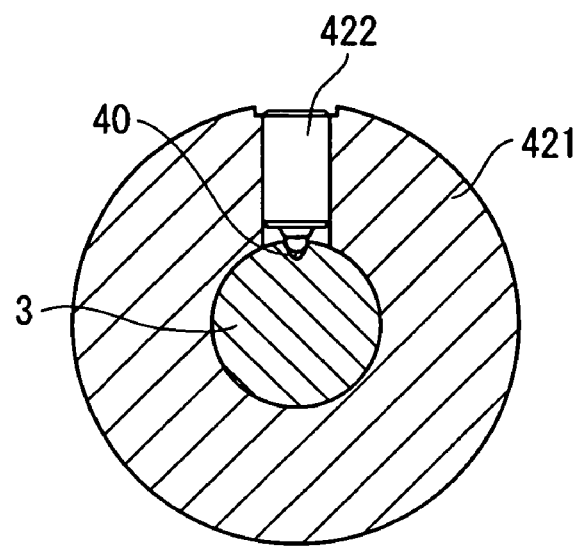
FIG. 5A is an illustration showing cross-sections of an engaging pin, an engaging groove and a pressurization unit of the aforesaid embodiment.

As shown in FIG. 5A, the engaging pin 422 is provided so as to slide relative to the rotor bushing 421 in the axial direction, the engaging pin 422 engaging with the engaging groove 40 of the spindle 3.

Figure 5B:
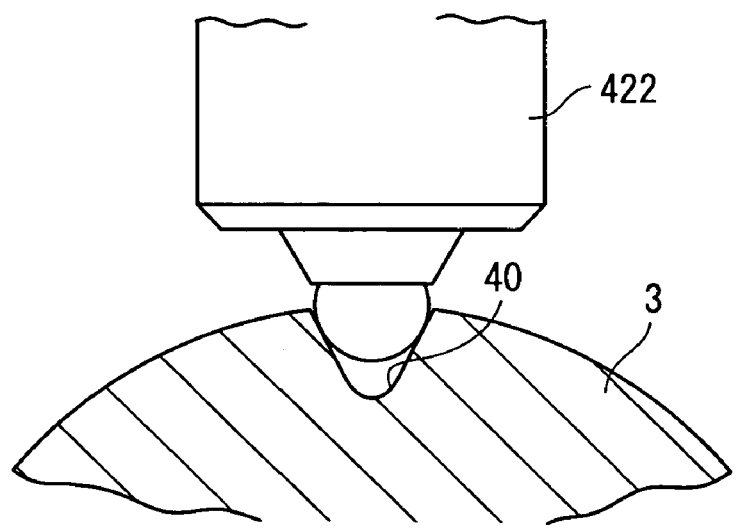
FIG. 5B is an illustration showing an enlarged primary portion of FIG. 5A.

As shown in FIG. 5B, the tip end of the engaging pin 422 is formed in spherical shape. The engaging groove 40 is formed in V-shape.

Figure 5C:
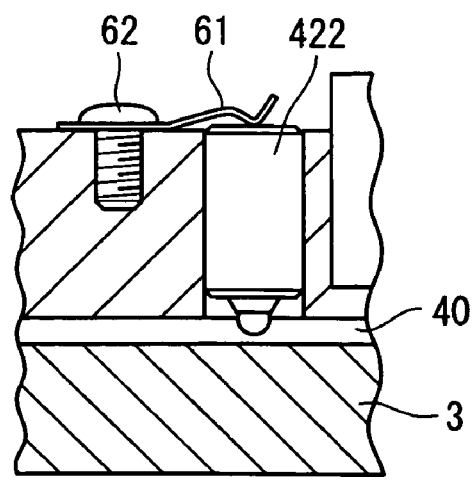
FIG. 5C is an illustration showing an enlarged primary portion of FIG. 5A seen from different direction.

As shown in FIG. 5C, the pressurization unit 6, which is fixed on the rotor bushing 421 at an end thereof, has at the other end thereof a leaf spring 61 for pressurizing the engaging pin 422 toward the engaging groove 40 as well as a fixing screw 62 for fixing an end of the leaf spring 61 on the rotor bushing 421.

According to the micrometer 1 having the above-described configuration, when the cap tube 236 or the thimble 235 is rotated, the spindle 3 is rotated due to the engagement between the guide groove 237 and the guide pin 32. The spindle 3 is then advanced and retracted in the axial direction by the spindle 3 screwing with the rear tube 21. When the spindle 3 is rotated, the rotor 42 is rotated by the engaging groove 40 engaging with the engaging pin 422. When the rotating angle of the rotor 42 is read by the stator 41, the rotating angle of the spindle 3 is detected. The displacement of the spindle 3 is calculated according to the rotating angle of the spindle 3 and the movement pitch per rotation of the spindle 3, and consequently, the displacement of the spindle 3 is displayed on the digital display 5 as the measurement value.

Thus, according to the micrometer 1 having the above-described configuration, since the lead screw 31 of the spindle 3 has the large pitch, the displacement per rotation of the spindle 3 can be increased. Therefore, since the spindle 3 can realize high-speed movement, the micrometer 1 can provide high operational performance.

Since the leaf spring 61 is provided and the engaging pin 422 is pressurized to the engaging groove 40 by the leaf spring 61, the engaging pin 422 can be abutted on the engaging groove 40 without clearance. Additionally, since the tip end of the engaging pin 422 is formed in spherical shape, and the engaging groove 40 is formed in V-shape, the spherical tip is abutted on the both sides of the V-shape, so that the engaging pin 422 can slide on the engaging groove 40 as well as the engaging pin 422 can be abutted on the engaging groove 40 without clearance. Accordingly, since the engaging pin 422 will not shake at the clearance relative to the engaging groove 40, measurement accuracy of the micrometer 1 can be enhanced.

Since the transmitting terminal 414 of the stator 41 contains 24 pieces, the number of which is three times as great as that of related art, the rotating angle of the spindle 3 can highly accurately be detected. Since the lead screw 31 of the spindle 3 has the large pitch, the movement pitch per rotation of the spindle 3 is increased. In the present embodiment, since detection accuracy of the rotor 42 and the stator 41 is enhanced, the measurement accuracy will not be deteriorated even when the lead screw 31 of the spindle 3 has the large pitch.

Note that, the measuring instrument of the present invention is not limited to the above-described embodiment, and it is obvious that various modifications can be applied thereto as long as the object of the present invention can be attained.

Figure 6:
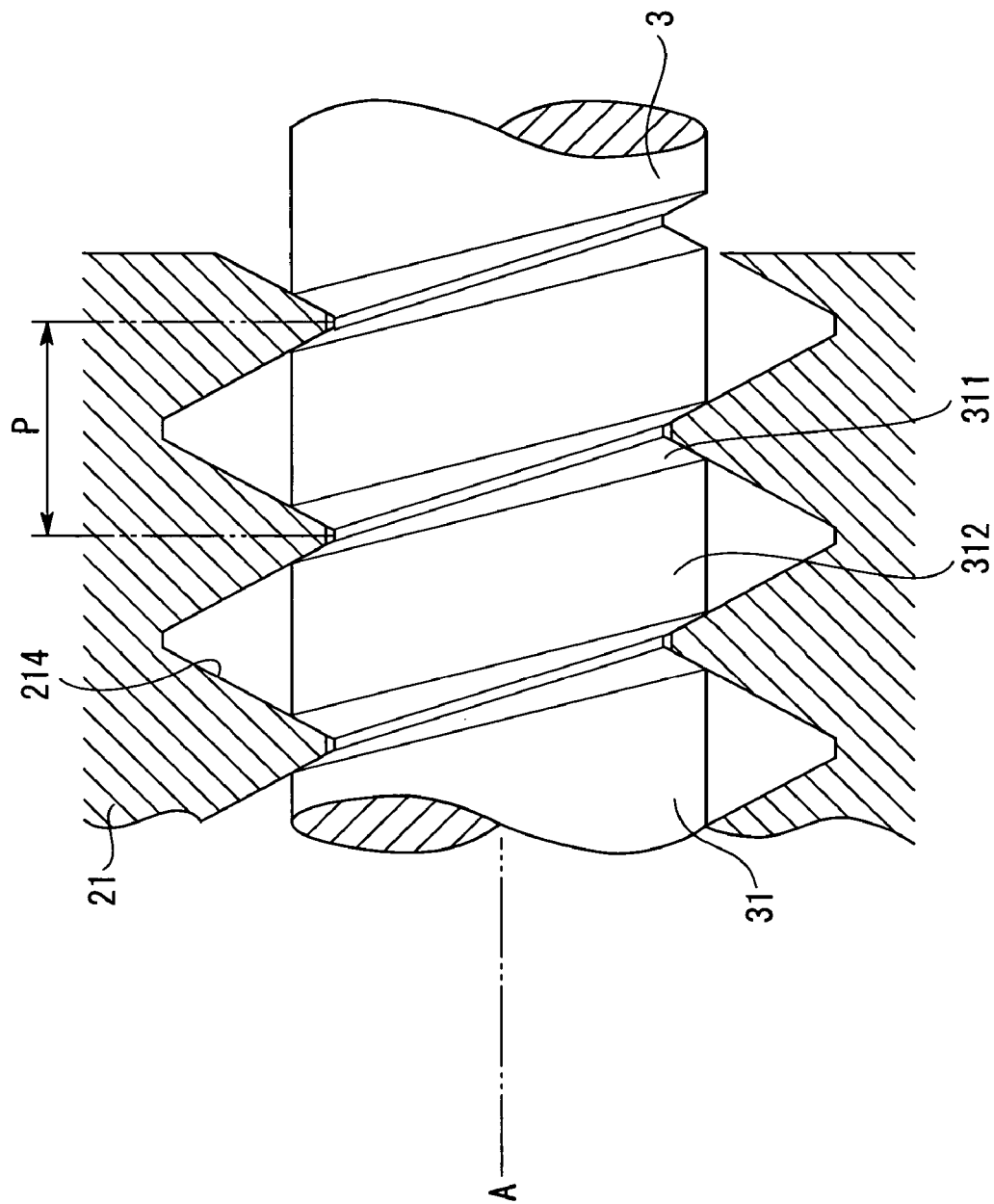
FIG. 6 is an illustration showing a modification of the fitting state of the lead screw with a female thread according to the present invention.

While the female thread 211 has the intermediate portion of threads 215 defined between the adjacent screw threads as a straight line along the screw axis line A on a cross-section along the screw axis line A, for instance, the female thread 211 may be formed by a large screw thread 214 as shown in FIG. 6. The machining allowance of the screw thread 214 will be increased as the scale of the screw thread 214 is enlarged, however, the strength thereof can be maintained if the rear tube 21 is sufficiently thick even when the machining allowance of the screw thread 214 is increased. In the case that the female thread with the large pitch is machined, the height of the screw thread 214 should be increased, so that the machining of the female thread will be simplified and thus the machining cost thereof can be decreased.

The pressurization unit 6 is not limited to the leaf spring 61, and any component can be applied instead as long as the pressurization unit 6 can provide pressurization such as oil hydraulics.

While the rotary encoder of electromagnetic induction type is employed as the detector in the above-described embodiment, various sensors such as a rotary encoder of electrostatic capacitance type or photoelectric type can be utilized.

Figure 7A:
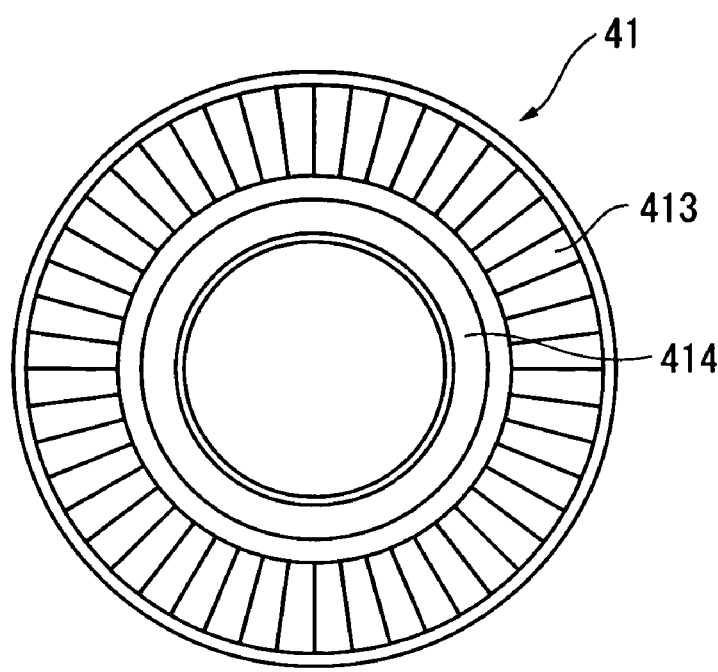
FIG. 7A is an illustration showing a modification of the stator according to the present invention.
Figure 7B:
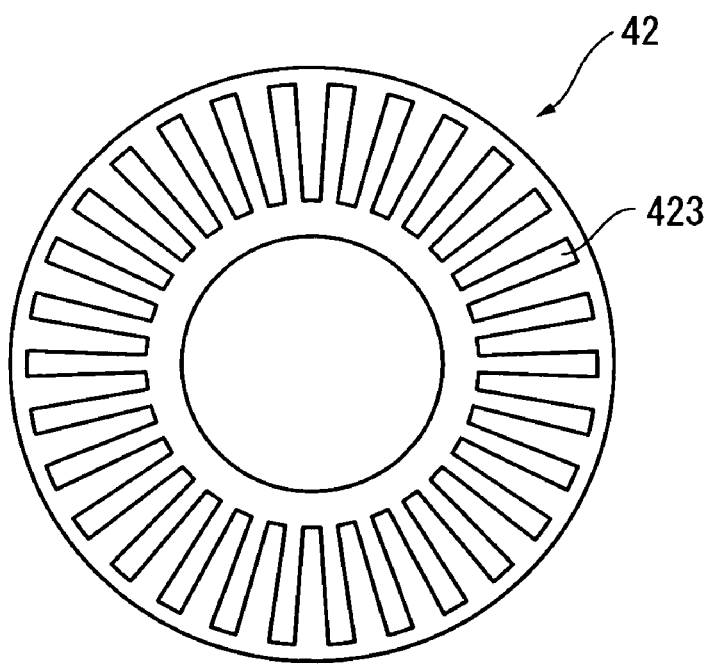
FIG. 7B is an illustration showing a modification of the rotor according to the present invention.

For example, the stator 41 is provided with a receiving terminal 413 and the transmitting terminal 414 as shown in FIG. 7A and the rotor 42 is provided with a coupled terminal 423, so that the angular strain is detected on the basis of the variation on the electrostatic capacitance of these terminals.

The measuring instrument is not limited to the micrometer, and any measuring instrument can be applied thereto such as a micrometer head as long as the spindle can be advanced and retracted along with its rotation.

INDUSTRIAL APPLICABILITY

The present invention can be used as a measuring instrument that measures dimensions etc. of a workpiece by advancing and retracting a spindle along with screwing rotation thereof, for instance, typically as a micrometer or a micrometer head.

The invention claimed is:

1. A measuring instrument, comprising:
 a measuring means, the measuring means including:
 a main body having a female thread; and
 a spindle having a lead screw screwed with the female thread and capable of being advanced and retracted in an axial direction along with rotation around the axial center, wherein
 a pitch of the lead screw is twice as large or more than the difference between an external diameter and a core diameter of the lead screw, and the difference between the external diameter and the core diameter is one-fifth or less of the external diameter, wherein the measuring means determines movement of the spindle relative to the main body.

2. The measuring instrument according to claim 1, wherein
 the main body has an anvil at an end of a substantially U-shaped frame and a female thread at the other end thereof,
 the spindle has a lead screw screwed with the female thread, is screwed with the other end of the main body, and is advanced and retracted against the anvil along with screwing rotation of the spindle,
 the measuring instrument, including:
 a detector that detects displacement of the spindle in the axial direction according to a rotation amount of the spindle; and
 a display unit that displays a measurement value on the basis of a detection signal from the detector.

3. The measuring instrument according to claim 2, the detector, including:
 a stator provided on the main body;
 a rotor facing to the stator;
 an engaging groove provided on the spindle along the axial direction;
 an engaging pin provided on the rotor for engaging with the engaging groove; and
 a pressurization unit that pressurizes the engaging pin toward the engaging groove.

4. The measuring instrument according to claim 3, wherein the stator and the rotor constitute a rotary detector of electromagnetic induction type.

5. The measuring instrument according to claim 3, wherein the stator and the rotor constitute a rotary detector of electrostatic capacitance type.

6. The measuring instrument according to claim 3, wherein
 the engaging pin is provided in a manner capable of sliding in a direction orthogonal to the axial direction of the spindle,
 the pressurization unit fixed on the rotor at an end thereof has a leaf spring at the other end thereof to pressurize the engaging pin toward the engaging groove.

7. The measuring instrument according to claim 3, wherein the engaging groove is formed in V-shape and a tip end of the engaging pin abutting on the engaging groove is formed in spherical shape.

8. The measuring instrument according to claim 1, wherein adjacent thread grooves of the lead screw are formed to have predetermined intervals in a direction along a screw axis line, and an intermediate portion of thread grooves is defined between the adjacent thread grooves as a straight line along the screw axis line on a cross-section along the screw axis line.

9. The measuring instrument according to claim 1, wherein the female thread has screw threads of the same pitch as that of the thread grooves, as seen in a direction along the screw axis line of the female thread, the adjacent screw threads being formed with predetermined intervals, and an intermediate portion of threads being defined between the adjacent screw threads as a straight line along the screw axis line on a cross-section along the screw axis line.

* * * * *